United States Patent
Mengual

(10) Patent No.: US 7,493,851 B2
(45) Date of Patent: Feb. 24, 2009

(54) REDUCED SIZE CITRUS FRUIT JUICING MACHINE

(75) Inventor: Joaquin Mengual Mengual, Valencia (ES)

(73) Assignee: Zumex Marquinas y Elementos, S.A., E-Moncada (Valencia) (ES)

( * ) Notice: Subject to any disclaimer, the term of this patent is extended or adjusted under 35 U.S.C. 154(b) by 344 days.

(21) Appl. No.: 10/595,483

(22) PCT Filed: Sep. 28, 2004

(86) PCT No.: PCT/ES2004/000424

§ 371 (c)(1),
(2), (4) Date: Apr. 21, 2006

(87) PCT Pub. No.: WO2005/041695

PCT Pub. Date: Dec. 5, 2005

(65) Prior Publication Data

US 2007/0074630 A1    Apr. 5, 2007

(30) Foreign Application Priority Data

Oct. 31, 2003    (ES) .............................. 200302553

(51) Int. Cl.
*A23N 1/00* (2006.01)
*A23N 1/02* (2006.01)
*A47J 19/02* (2006.01)
*B30B 9/02* (2006.01)
*B30B 9/20* (2006.01)

(52) U.S. Cl. .............................. 99/504; 99/501; 99/509

(58) Field of Classification Search ........................ None
See application file for complete search history.

(56) References Cited

U.S. PATENT DOCUMENTS

| 2,065,271 | A |   | 12/1936 | Faulds |         |
|-----------|---|---|---------|--------|---------|
| 2,463,125 | A |   | 3/1949  | Smith et al. |   |
| 2,659,298 | A | * | 11/1953 | Hudson | 99/495  |
| 3,267,838 | A | * | 8/1966  | Alberto | 99/506 |
| 3,858,500 | A |   | 1/1975  | Rohm   |         |
| 5,170,699 | A | * | 12/1992 | Senalada | 99/504 |
| 5,269,218 | A |   | 12/1993 | Alexander et al. | |
| 5,445,067 | A | * | 8/1995  | Font   | 99/502  |

FOREIGN PATENT DOCUMENTS

| ES | 2055650 A1 | 8/1994 |
|----|-----------|--------|
| ES | 2053357 B1 | 2/1995 |
| ES | 1029650 U | 6/1995 |

(Continued)

*Primary Examiner*—Joseph M Pelham
(74) *Attorney, Agent, or Firm*—Vedder Price, P.C.

(57) ABSTRACT

This invention is a reduced size citrus fruit juicing machine that uses sets of rotating male-female drums characterized by having one sole female drum and one sole male drum with an automatically positioning blade and a retaining pendulum—turning device. These characteristics avoid having to incorporate a second set of drums into the machine since the remaining half of the fruit is turned after the cut into the following upper cavity of the female drum. In addition to maintaining the performance of similar machines of greater size, it improves hygienic conditions due to an appropriate disposition of the retaining pendulum, a ribbed opening for the fruit, a peel collector and an integrated customized juice container which are isolated from the outside, all of which make it especially attractive to hotels and restaurants that do not have much available space.

11 Claims, 10 Drawing Sheets

FOREIGN PATENT DOCUMENTS

| | | |
|---|---|---|
| ES | 2070141 T3 | 6/1995 |
| ES | 1034325 U | 1/1997 |
| ES | 1035280 U | 3/1997 |
| ES | 2128208 A1 | 5/1999 |
| ES | 1043255 U | 12/1999 |
| ES | 1046860 U | 2/2001 |
| ES | 2170602 A1 | 8/2002 |
| ES | 2178609 A1 | 12/2002 |
| ES | 2189556 A1 | 7/2003 |
| FR | 2836016 A | 8/2003 |

\* cited by examiner

REDUCED SIZE CITRUS FRUIT JUICING MACHINE

PURPOSE OF THE INVENTION

This invention is a new automatic citrus fruit juicing machine used primarily for juicing oranges. It is smaller than those machines currently on the market that have a juicing system based on two pairs of rotating male-female squeezing units or drums. Nevertheless this machine produces the same yield and furthermore offers a greater degree of hygiene. This smaller size has been achieved by reducing the number of rotating squeezing units from four to just two, which consist of one female squeezing unit and one male squeezing unit. These operate using a novel turning device—pendulum retaining unit that substitutes the function of the second pair. The main features ensuring hygiene throughout the entire machine are a suitable pendulum retaining unit, a ribbed feed opening for the fruit, a peel collector and an integrated juice container, all of which are isolated from the outside of the machine.

THE STATE OF EXISTING TECHNIQUES

Currently in the restaurant and hotel industry there exists a wide range of automatic or semiautomatic citrus fruit juicing machines that employ different squeezing methods. These machines carry out their purpose to one degree or another. The pioneers of these machines based their juicing action on the two halves of the fruit that had been previously cut by pressing them onto a grooved surface which would extract the liquid. An example of this type of automatic juicing machine is Spanish patent P8702074 of 1987. This machine would dispense chilled juice after inserting coins. This machine's juicing system consists of loading the fruit onto a clamp which moves along a curved enclosure equipped with a blade so that the two halves of the fruit produced by the cut are submitted to a ripping action of the pulp by compression and deformation against the enclosure, thus extracting the juice.

Nevertheless, the problem with these systems is that they destroy the peels of the fruits when they are dragged across the grooved surface, similar to how sandpaper works. Such action leads to albedo fluids and essential oils from the peels mixing with the extracted juice. Furthermore, a significant part of the juice is retained by the unwanted pulp. The end result is a loss in yield and a low quality juice.

Later machines, such as the model registered as U9602180, squeezed the entire fruit by compressing it against a plate that was pushed downward by an actuating cylinder acting as a piston. The fruit was squeezed against the surface of a vessel or container which had the dual purpose of holding the fruit during squeezing and of collecting the juice that had been extracted. In this other type of system, the above problem is not solved either. Although there is no violent ripping action against an enclosure or grooved surface, the force of compression against the orange itself also affects its peel which is squeezed along with the rest of the fruit.

Since this was a known problem, more sophisticated systems began to be developed in which the juicing action on the fruits would not affect the peels. This is to say that the goal was to create a machine in which the waste created would be the entire peel, free of pulp and juice.

One solution was the use of suction in the juicing systems. One example of such a machine is the model registered under U9900512. This machine has a system based on a drum with a series of cavities. Each cavity allows the fruit encased within it to be cut in half by a blade moving along the perimeter of the drum. The halves are then subjected to a suction process by an arm with a male perforating end which, by compression, acts upon the half of the fruit encased in the cavity of the female drum. All of this occurs without coming into contact with the peel; the juice is extracted by the male perforating part with a suction pump and passes through a conduit designed especially for this function.

Nevertheless, these systems are not free of problems either. The sucking action does not achieve a complete extraction of the juice and afterwards the juice must be put through filtering systems and separators for the air and pulp carried within the juice. Additionally, the juice often contains impurities and suspended particles.

Among the range of citrus fruit juicing machine systems on the market today, the one which is clearly the best and most common because it effectively addresses the problems mentioned above, as well as producing a high yield, is the system in the two machines patented by the company that is currently applying for the new patent presented here.

The known juicing system of these machines (Spanish patents with application numbers P8800970 and P9101254) is based on a set of two pairs of rotating cylinders or drums, the upper two of which are female and equipped with four semispherical cavities and two lower male drums. The male drums have three finished arms with ball-shaped heads. When a piece of fruit falls into a cavity of the female drum, the opposing rotational movement of the drum adjacent to the fruit is retained and moved between both towards the blade located below, which cuts the fruit into two halves. Immediately after leaving the base of the blade, which is angled above the fruit, each half will be squeezed by the corresponding arms of the two male drums which embed themselves into each half resulting in a complete and clean extraction of the juice. After the extraction, the juice passes through a filter and is collected into a container while the peels pressed against the male pieces will fall into a collecting bin with the help of an extracting wedge.

Currently this is the best serial juicing system. It is hygienic, economic, offers high yield, and is suitable for bars, cafeterias, schools, hospitals and the like. Nevertheless, as the units based on this system require four drums or cylinders, their frames will be of considerable size and take up much space in these businesses. These businesses do not always have a lot of space which may negatively influence their decisions regarding the installation of these machines. The reality of the situation is that the current market lacks small automatic machines made for the hotel and restaurant industry (household use is a different matter where practically the entire process is manual, barring the squeezing step). This is especially true for automatic machines with the same features that the male and female rotating drum system uses. For example, there is a patented reduced size machine (application P9800682) that uses a compression based juicing system. It has a drum equipped with a blade and compression blade that cuts the fruit and immediately squeezes it against its sides. Nevertheless, this system poses the problems mentioned above: excess pulp with residual juice and fluids from the peels that mix into the extracted juice.

There is a smaller machine in existence that has been patented which uses a system inspired by the male-female rotating drum idea. The inventor has managed to reduce its size by replacing the second pair of drums with a fruit carrier that occupies the space that a third cylinder would have taken up. Thus, disappointingly, the size of the machine is reduced only minimally.

The ideal situation would be to have a machine with the same level of operability as those with two pairs of male-female drums, but with only one such pair of drums. This means that there would be only one rotating male drum and only one rotating female drum. Such a system would be possible if the machine integrated a complementary system which would effectively provide the functionality of the second pair of drums. In this way, the size of he machine would be reduced to almost half and offer the same yield.

DESCRIPTION OF THE INVENTION

This is precisely what the invention in question offers. It is an automatic juicing machine for oranges and similar fruits that has a juicing system based on a set of male-female rotating drums. This machine has a gravity feed ramp, a casing with a protective front cover that encloses the frame that supports the ramp and serves as a support for the motor and other mechanisms and parts. Among the more important of these include the cutting blade, the male and female rotating drums with their corresponding cavities and arms used for holding, guiding and squeezing the fruit, the filter, the base where juice and peels are collected and the peel extracting wedge.

The essential characteristic of this machine is that it has one sole male and one sole female drum. This reduces the size of the machine considerably. This system employs one retainer pendulum with the dual function of allowing the fruits to reach the female drum at the right moment and of holding them secure to allow cutting by the automatically positioned blade. This blade, together with a triangular cutting part guides the half of the fruit retained in the cavity of the female drum until it comes into contact with an arm of the male drum which then squeezes the fruit due to its rotating action. This together with the retaining pendulum is the essence of the system that has eliminated the need for having a second set of drums. The remaining half of the fruit after the cut will turn into the proper position in order to sit in a cavity of the female drum at the same time. Its upward movement opens the way for a new fruit which falls into the next free cavity, thus starting the squeezing sequence over again.

The system further incorporates a feeder with a fruit detection system that allows the machine to start automatically and prevents jamming. The machine has a fruit counting system, a peel collector, an anti-drip tray and an integrated juice container at the base of the machine which, together with a deck equipped with a guiding wing, isolate the juice from contaminating particles and extraneous material.

With the male drum—female drum—turning device—retaining pendulum system described above, the two halves resulting from the cut of each fruit are squeezed sequentially rather than simultaneously as occurs with prior juicing machines. In order to achieve this, all action in the machine is powered by only one motor with its simultaneous kinematic gear movement. The motor actuates the male and female rotating drums as well as a cam positioned at the perimeter which, when rotated, activates and deactivates a rocker arm and guided counterweight, thus raising and lowering the rotating piece. The result of this is the positioning of the fruit into an upper cavity of the female drum, and at the same time pushes the retaining pendulum. This in turn actuates the dispenser allowing the next fruit to enter the system. The upward movement of the turning device is caused by the guided counterweight and the downward movement by the cam-actuated rocker arm. Both transfers in both rotor directions are guided by flexible belts for preventing possible tearing from imperfect processing. The blade is integrated into the turning shaft and thus is synchronized and automatically positioned with the female drum in preparation for the cut.

The blade is straight with the cut starting in the center at a slight angle so that the two halves of the fruit will be virtually the same size. The blade has the dual purpose of both cutting the fruit and, together with the triangular cutting piece located below it, guiding the half towards the arm of the male drum.

The female drum has deeper cavities than those in previous machines. These deeper cavities more effectively surround and secure the half of the fruit thus increasing the yield of the juicing process and reducing splatter. Furthermore, the machine has an undercutting operability which allows the blade to give a fuller and cleaner cut. The male drum has an opening in the center of the shells so that the lever of the extracting wedge can pass through, thus allowing the peels to reach the storage container.

The frame of the machine consists of a single plastic die-cast housing piece. It has a stainless steel front and an "8-shaped" metal bearings support. It is strong enough to withstand the force of the squeezing process. This is one sole part that secures and supports all of the other parts with a rerouting channel so that the juice will pour into the tray. It also has an integrated fruit feed system. This differentiates this machine from all of the other juicing machines that have open feed systems. This invention presents the novel idea of a closed system that prevents insects and contamination from entering, thus offering a greater degree of hygiene. The feeder has an exterior ramp with two rails for guiding the fruit. The end of this feeder has a fruit detection system. It further has a housing with a cylindrical dispenser, a slightly eccentric axis, magnetic clutch and flexible transmission in the connection with the rocker arm and a ribbed output aperture towards the female drum which isolates the juicing area from the outside.

The fruit detection system allows the machine to start automatically and count the number of pieces of fruit. It turns every one of these, thus preventing jamming and stops the machine when no more oranges are ready to be juiced. The frame of the machine has an opening at the height of the peel extracting wedge so that the peels will fall into the peel collector. The surface above from where the juice falls has a flange and a slope that is adequate for good circulation from the tray. An anti-drip system and collecting container are integrated into the tray.

The lower base support of the machine has a U-shaped perimeter which houses a lost liquid collecting tray. The lower part of this flange is equipped with a grip strip which is located between the machine and the bar or table where the machine rests, thus preventing contamination and unwanted materials from entering. In addition, the base has integrated handles which makes moving the machine easy.

The custom peel collector that is integrated into the machine has a marked removal area in its lower part which coincides with the U-shaped flange of the perimeter along the base. This allows for the controlled removal of the tray without using any tools and allows it to easily adapted for back bars or for using a peel collecting bin. It also has a peel deflector, which is a ramp that distributes the peels more evenly as they fall so that the space is better used. They are guided towards the mouth of the output aperture in the case that the collector is used with its perforated base.

The juice tray has an anti-drip device with a spigot and may be actuated automatically by positioning the container on its lower part (when the container is positioned here the system is actuated and when it is removed it ceases its activity). The device can also be used manually by using the hand for actuation. The anti-drip has a control button mechanism that when pressed causes the piston to move downward thus allowing the liquid to begin flowing. The peel collector and the juice container are parts which are integrated into the design of the machine and isolated from contaminating particles and extraneous substances. This is a novelty in juicing machines used in the hotel and restaurant business. It is also a novelty in that there is the dual possibility of actuating the anti-drip spigot both manually and automatically by positioning a container at the proper place.

The cover of the machine is made up of two parts, one of which is translucent and the other transparent. This cover gives the machine a novel appearance in that in its lower part there is a wing that routs the juice to the tray. The cover prevents dripping even when it is open.

All of these novelties that this invention offers means that its overall advantage is that its performance is as good as any machine currently offered on the market that uses two pairs of rotating male and female drums but with a much smaller size. This advantage makes it especially attractive for hotels and restaurants that do not have a lot of available space.

Additionally, the system has the same high standard of hygiene as it does for its operability. This is not just because the retaining pendulum prevents contact between the peel and rotating piece during the cut (which encases one of the two halves of the fruit on the pulp side) but also because of the ribbed opening of the feeder, which isolates the inside of the machine and prevents contamination and insects from entering. Further, this high standard is a result of the peel collector and juice container being integrated into the base, both of which close off access of extraneous material.

In order to have the make-up and operation of the reduced size juicing machine under consideration more clearly understood an example of its operation is offered below along with an explanation of important details based on the drawing in FIG. 1. In this figure the machine is shown from a raised frontal perspective, while in FIGS. 2 through 10, the different mechanical parts of the invention are shown.

Figure 1:
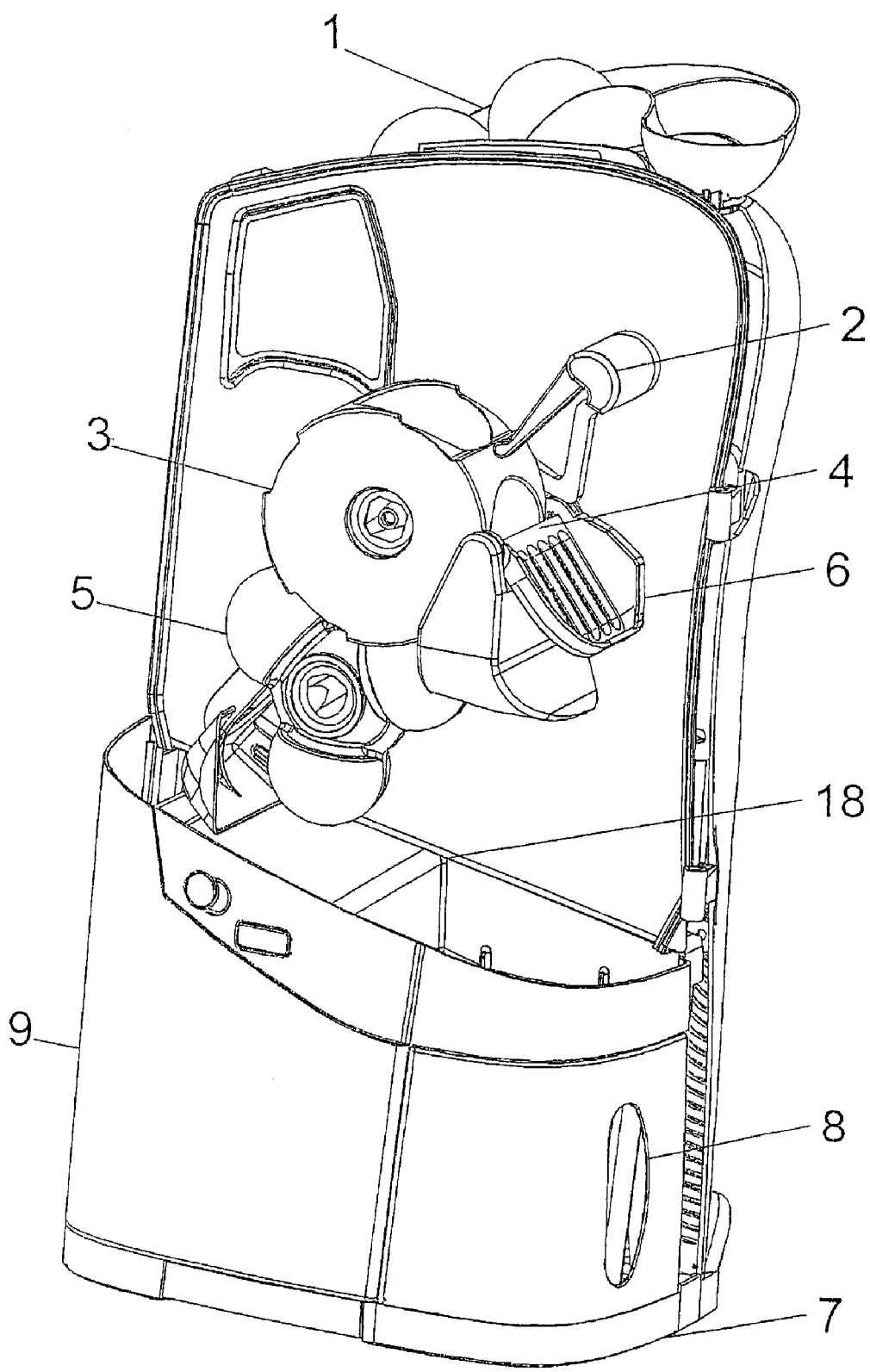
FIG. 1 shows the essential parts of the design:
feeder (1)
retaining pendulum (2)
female rotating drum (3)
cutting blade (4)
male rotating drum (5)
turning device (6)
base of the machine (7)
base supporting the juice collecting container (8)
peel storage collector (9)
rerouting apparatus for juice falling into the tray (18)
Figure 2:
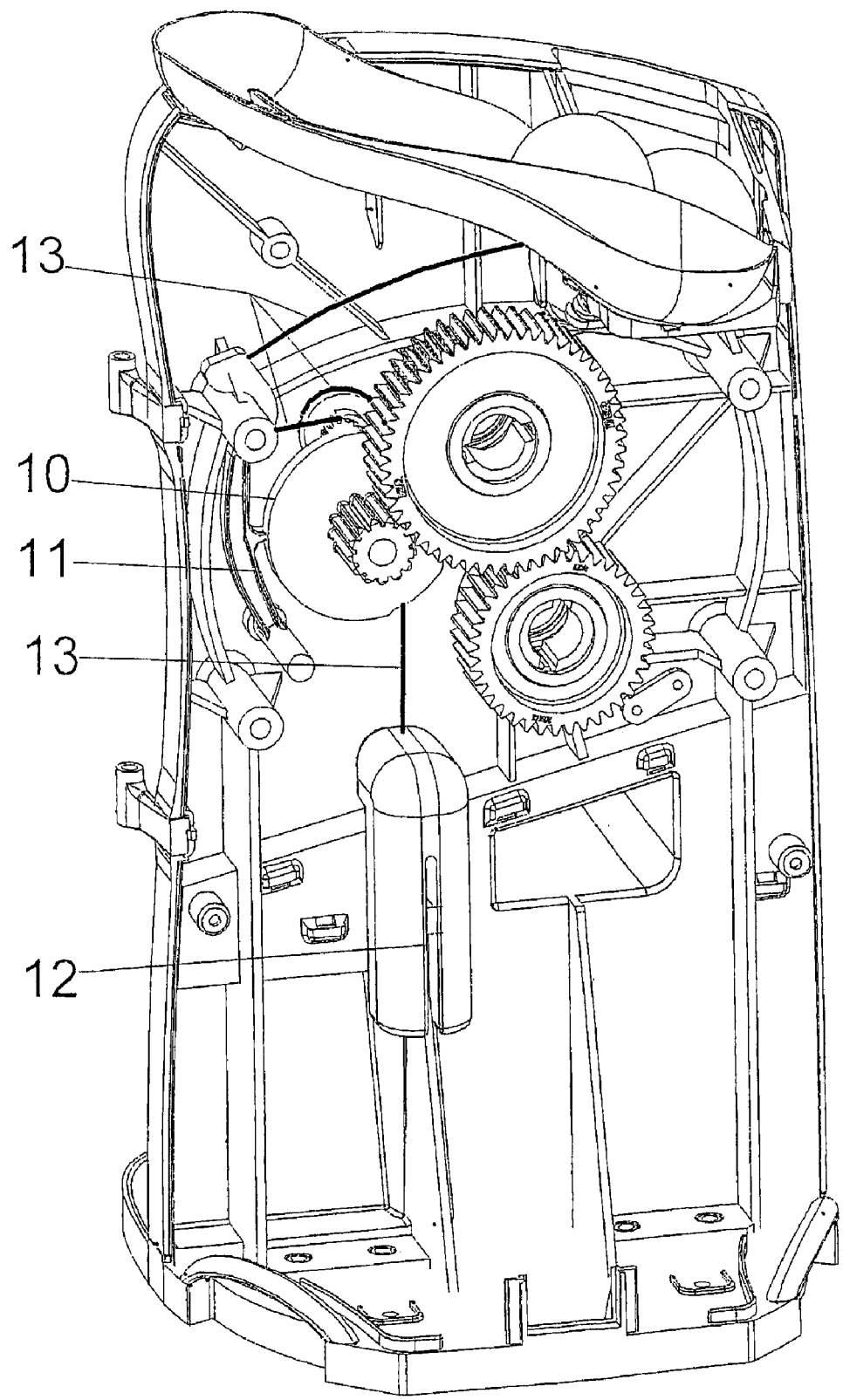
FIG. 2 shows the back end of the frame with the detailed engineering of the turning device—retaining pendulum system:
gear kinematics and cam (10)
rocker arm (11)
counter weight (12)
flexible belts (13)
Figure 3:
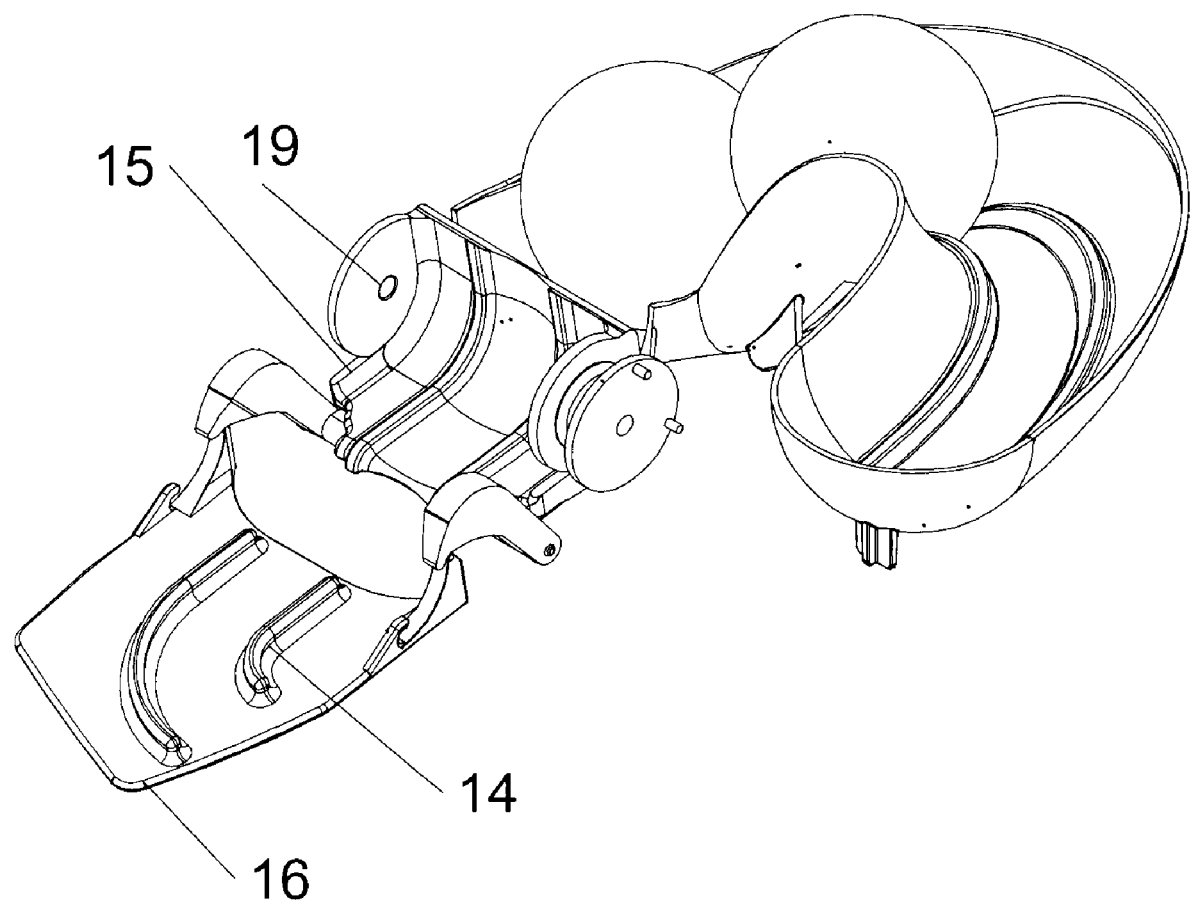
FIG. 3 shows a cross section of the fruit detection system that is part of the feeder:
guide rails for the fruit (14)
cylindrical dispenser (15)
cavity for encasing the fruit detection system (19)
ribbed output opening (16)
Figure 4:
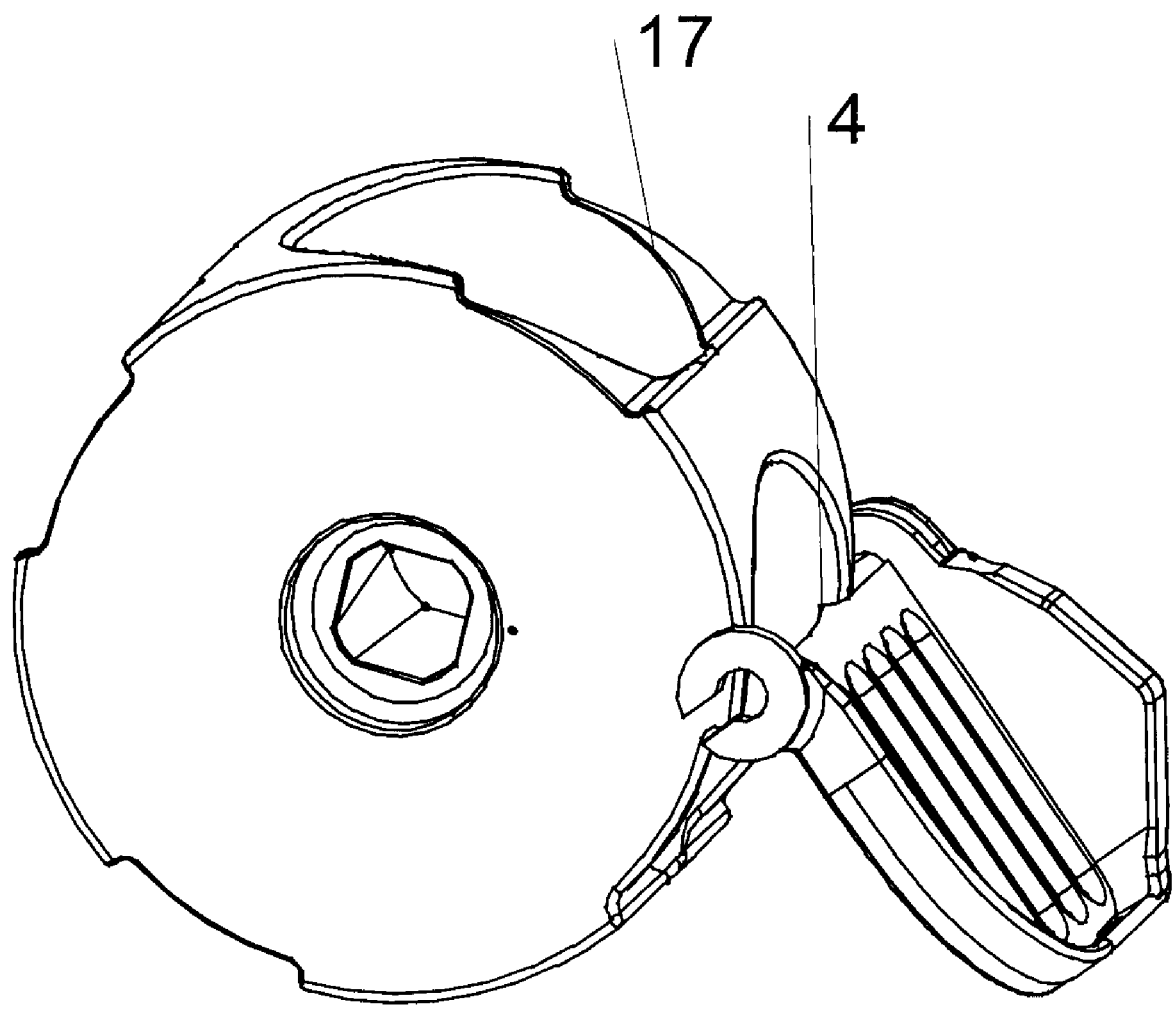
FIG. 4 shows the female drum and turning device along with the grooves (17) of the cavities of the female drum and blade (4) which are integrated into the turning device.
Figure 5:
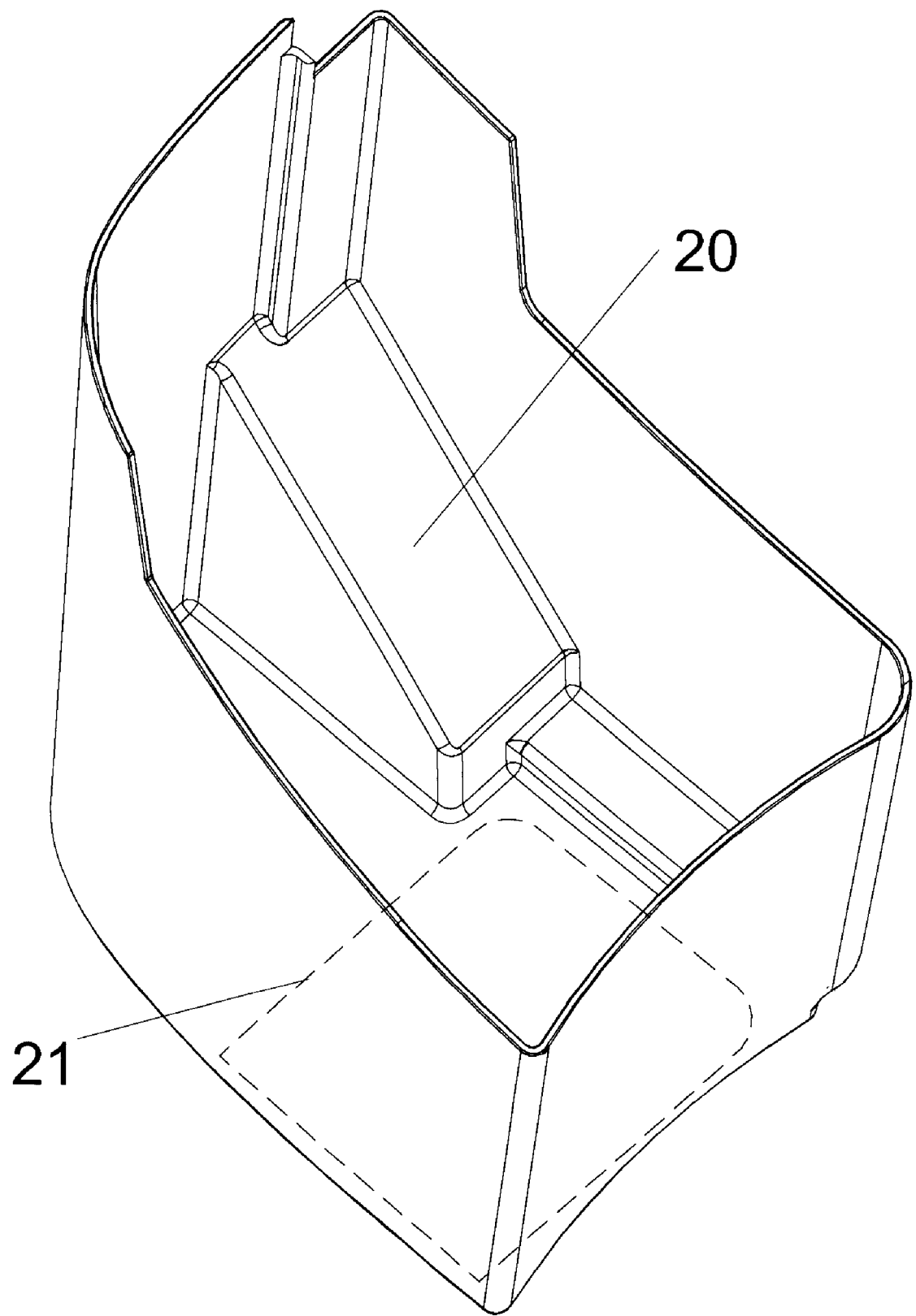
FIG. 5 shows the customized peel collector in the base and highlights the deflecting ramp (20) and a premarked rupture area (21).
Figure 6:
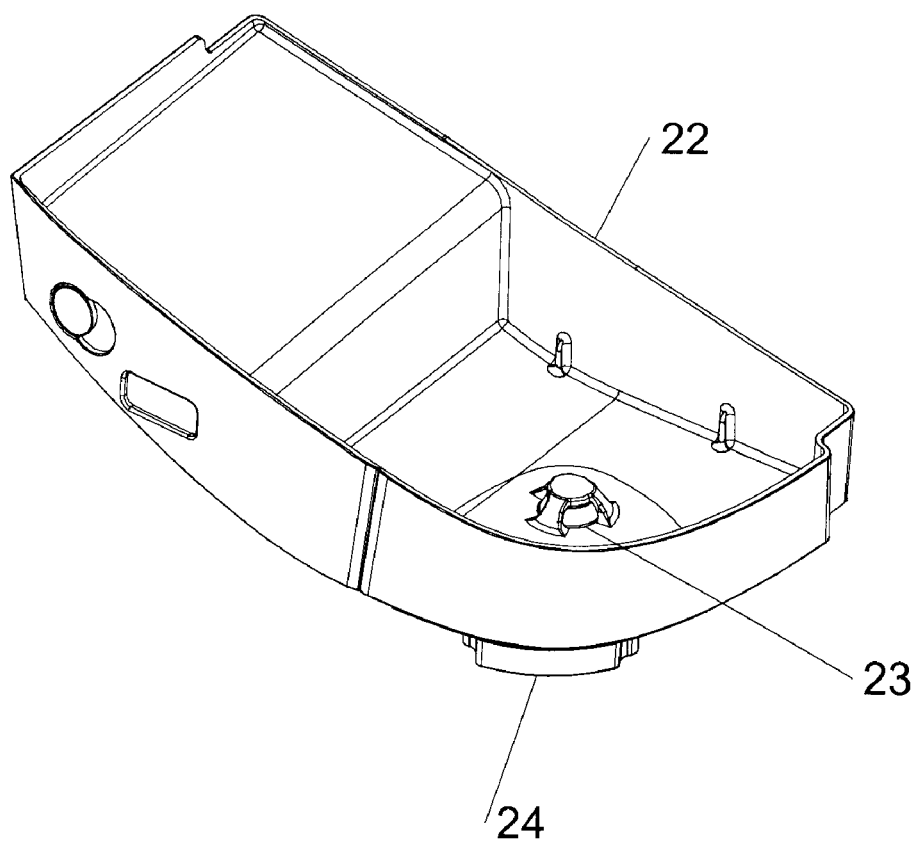
FIG. 6 shows the juice tray (22) with the integrated anti-drip device where the control button is located (24) and the open and close mechanism of the anti-drip device can be seen (23).
Figure 6:
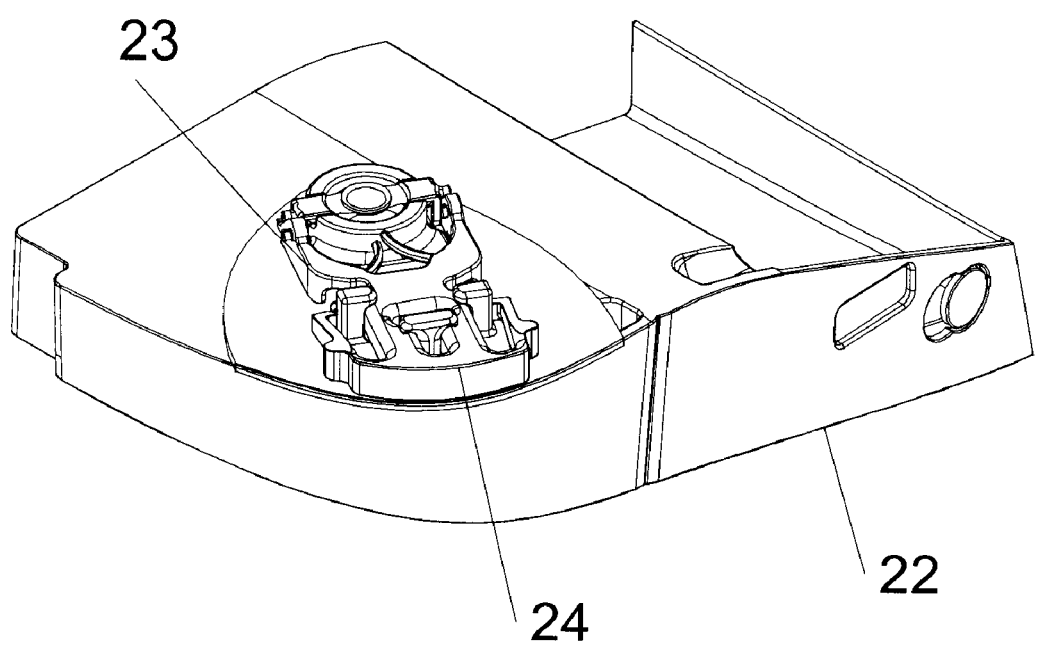
Figure 7:
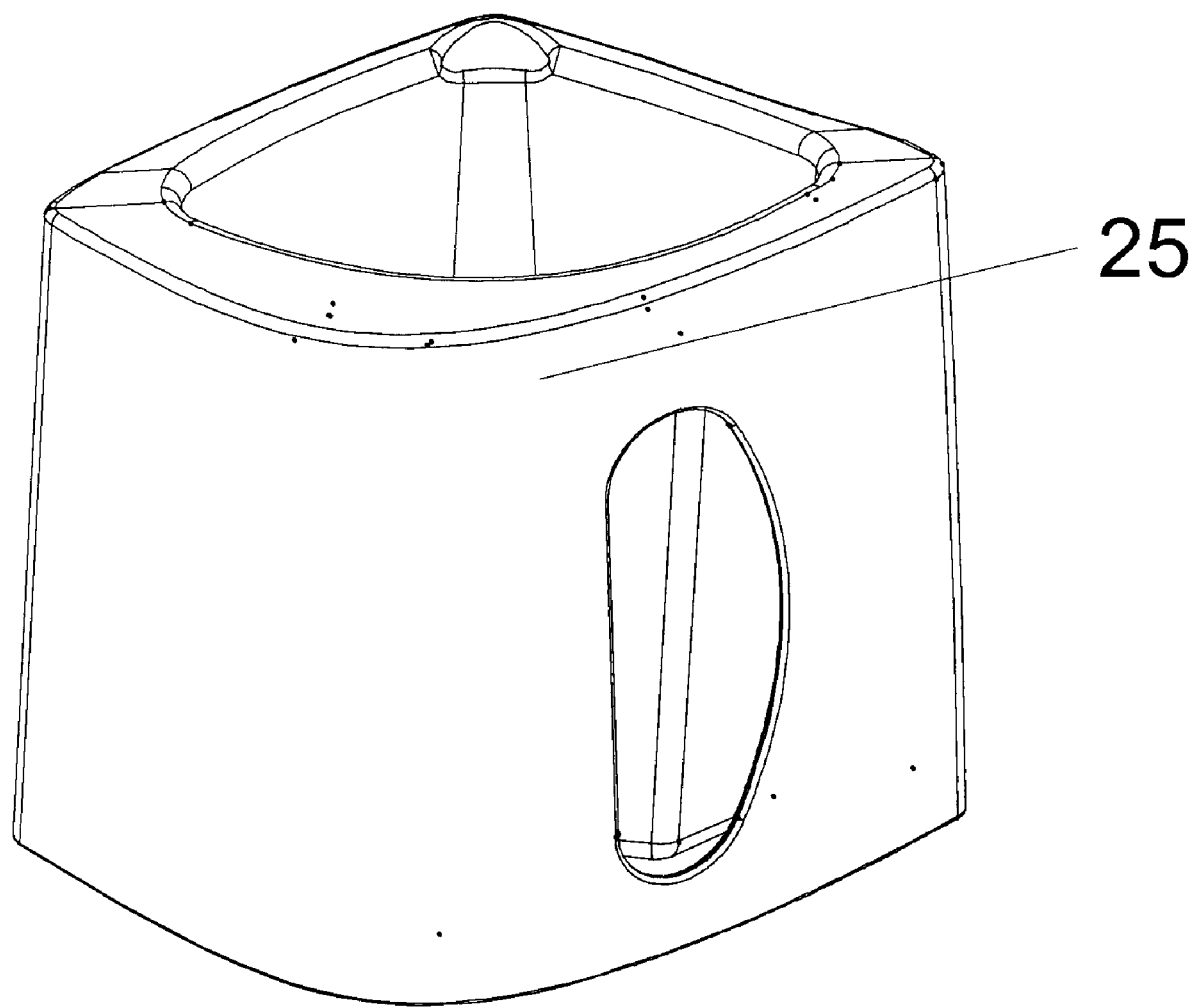
FIG. 7 shows the customized juice container (25) which complements the anti-drip device control button which causes it to be automatically actuated.
Figure 8:
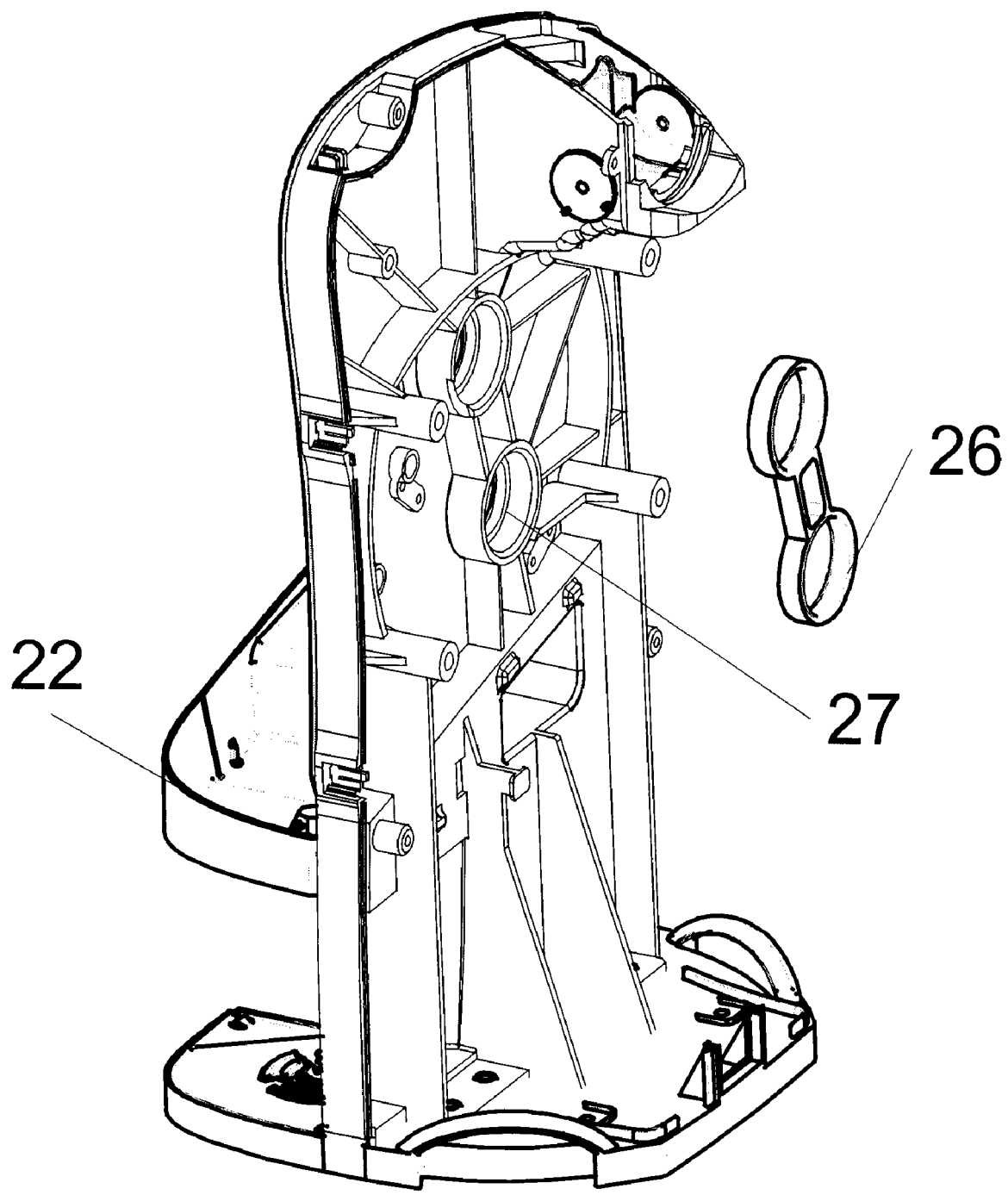
FIG. 8 shows the "8-shaped" piece (26) that is housed in a cavity within the frame (27), and once the machine is set up, sustains the bearings of the male and female drum shafts.
Figure 9:
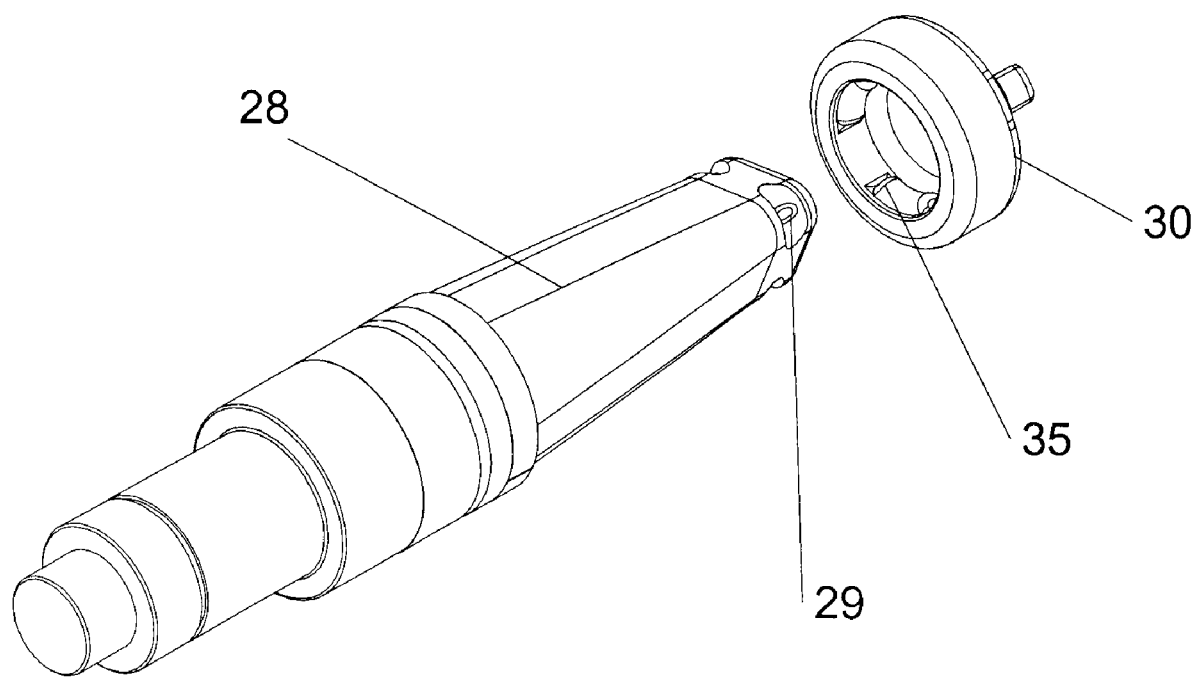
FIG. 9 shows the geometrical section of one of the shaft ends (28) where at a certain height the edges have grooves (29) that sustain certain protuberances (35) in the inside area of the closing device (30) which leaves this part set as the butt of the shaft.
Figure 10:
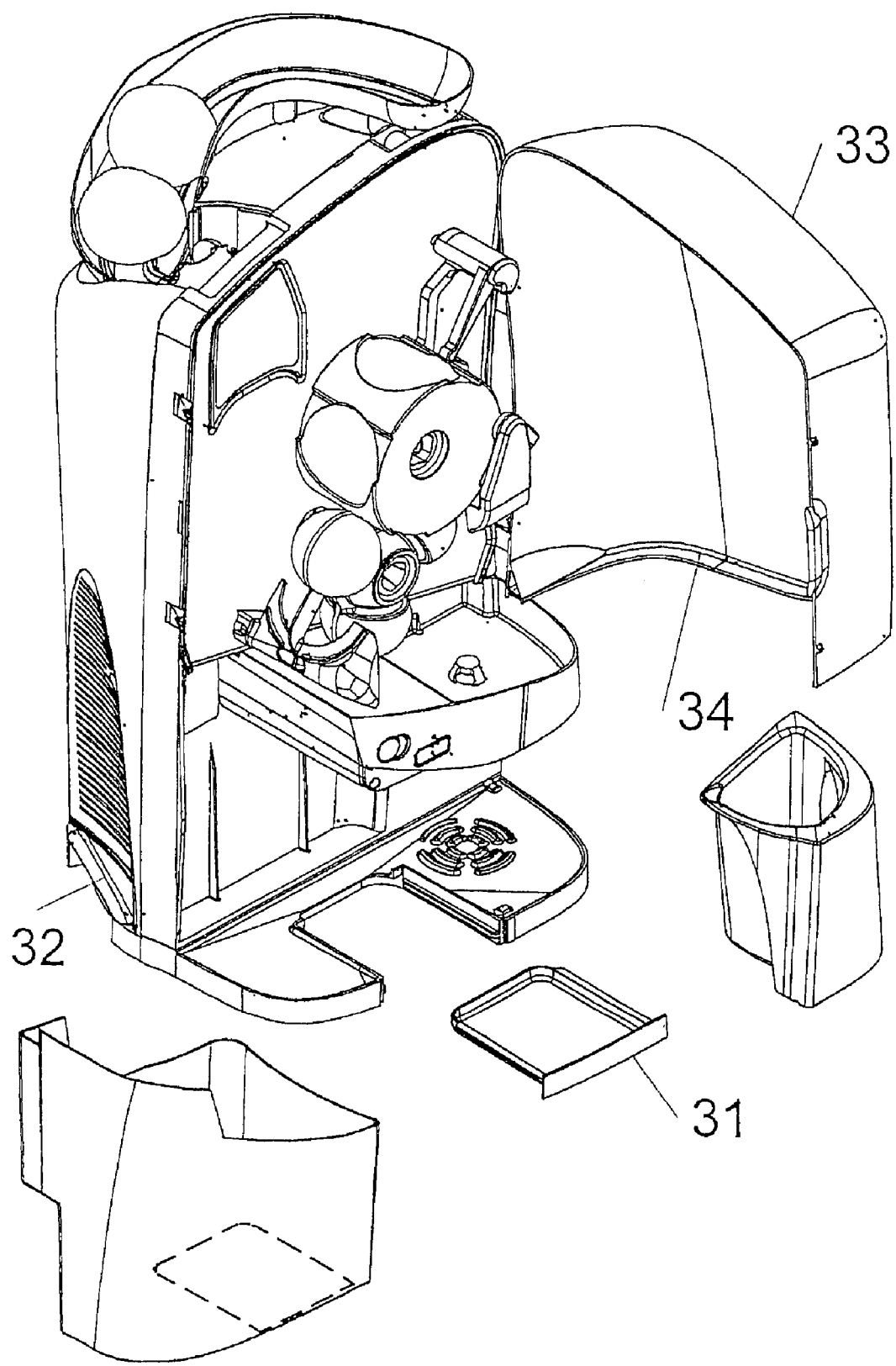
FIG. 10 shows the machine with the cover open (33) where the lost liquid collecting tray (31) is set in its operational position, the rupture area of the peel collector (21) and the handles (32) that are integrated into the base.

Other pieces that can be seen in the interior part of the cover include the routing wing (34) that routes the juice to the tray.

PREFERRED SETUP OF THE INVENTION

The juicing machine has a frame that serves as its skeleton. This frame supports the feed ramp, the motor and the different mechanisms and parts. Among the more outstanding novel parts are the rerouter (20) for the excess juice that falls to the tray and the fruit detection system (21).

The back part of the frame has the mechanisms that allow the operation of the parts that carry out the juicing process, which are located between the front of the machine and the protective cover.

The control system consists of an operations button that includes all of the functions, integrated detectors in the circuitry and a display that gives informational messages. The latter of these is a novelty in juicing machines for hotels and restaurants.

The machine has automatic multivoltage electrical power which allows it to be connected in any part of the world without an adapter, which also is a novelty. Additionally, the machine has a socket for autonomous alternating 24 V current which allows it to work on battery power.

A feed ramp (1) is located in the frame which holds the fruits which will fall into the juicing system, one by one, due to the force of gravity, while the dispenser (15) allows them to pass. When this system at the end of the feeder receives the first piece of fruit, the rocker arm and magnetic grip are actuated by the clutch magnets, which may be either mono or multipolar; this changes position of the dispenser by turning around its shaft and prevents the second piece from entering. Meanwhile the first piece exits towards the interior of the machine through the ribbed opening (16) which is opened due to the turning action of the dispenser and is then deposited into the corresponding cavity of the female drum.

The juicing system is composed of one sole female rotating drum (3) with several cavities and one sole male rotating drum (5) with several arms with ball shaped ends. Replacing the action of the second pair of drums is a turning device (6) that operates in combination with the retaining pendulum (2).

The shafts of the drums have a fast shutdown and do not need threaded parts. These are sealed with a special customized retaining piece. It is easy to set up and clean since the geometry of the retainer prevents small angles. Once the fruit is encased in the first cavity of the female drum (3) that it encounters after falling from the feeder, the clockwise rotating movement guides it towards the cutting blade (4) where it is cut into two halves. During this process the pendulum (2) secures the fruit on the side opposite the drum which results in a symmetrical cut. Once the fruit has been cut, one of the two halves remains in the cavity of the rotating female drum (3) where it is moved with the help of the base part of the cutting blade (4) which prevents it from falling out. The half then comes into contact with one of the arms of the male rotating drum (5) which is rotating in the opposite direction thus squeezing the fruit half that is secured in the cavity of the female drum. The juice is squeezed out by plugging the end of the male drum's arm into the cavity with a cupping action. The other half of the fruit is positioned into the turning device (6) on its pulp side and at the right moment (when the rocker arm is freed up by the cam) it is turned into the following upper cavity of the female drum, being turned just enough to be properly placed into the cavity.

As the half is being raised, the turning device (6) pushes the retaining pendulum (2) and allows a new fruit to enter into the system by falling into the free cavity of the rotating female drum, therefore the sequence to start over again.

Thus, the pendulum has a dual purpose in this new machine: it allows fruits to pass into the system once the juicing sequence has begun, and secondly it secures the fruits so that they will be cut correctly, ensuring that the fruit does not come into contact with the turning device so that it will remain clean.

The two halves of the fruit are squeezed sequentially due to the action of the male and female drums. The juice is extracted into the tray, which is equipped with a filter in order to prevent seeds and large pieces of pulp from remaining in the juice.

If the juice collecting container is attached to the anti-drip device, it remains in the open position and the juice is directly collected into the container that is located at the base of the machine and below the tray. When the container is removed, the anti-drip device is automatically closed. This device may also be actuated manually by simply pressing its control button (24).

The extracting wedge, which is a flap that passes through the center opening (9) of the shells of the male drum, removes the peels adhering to it into the peel collecting container.

The shafts of the male and female drums on their free ends have a geometrical shape. The edges of these ends have a series of grooves that, when the butt is inserted into one of them, they are secured by adhering to these groves since these butts have protuberances on their internal face. This avoids having to use nuts and makes setting up and taking apart the drums easier, which in turn makes cleaning easier.

The invention claimed is:

1. A reduced size fruit juicing machine for obtaining a juice from fruits comprising:
   a frame;
   a feeding ramp, connected to the frame, that works by taking advantage of the force of gravity;
   a motor;
   one sole female drum;
   one sole male drum;
   a casing with a protective front cover that encloses the frame, supports the feeding ramp, secures the motor, and encloses at least one of the following: a cutting blade for cutting a piece of fruit into a first half and a second half, the male drum, the female drum, and protuberances for encasing, guiding, and squeezing the fruits;
   a filter;
   a housing base that holds a juice collecting container and a peel collector;
   a turning device;
   a retaining pendulum with the dual purpose of allowing the piece of fruit to pass into the female drum once the juicing sequence has started and of securing the piece of fruit when it is being cut by the cutting blade, which together with a triangular cutting piece supporting the turning device, guides the first half of the fruit into a first cavity of the female drum, which in turn rotates towards an arm of the male drum in order to extract the juice;
   a feeder having a dispenser and a fruit detection system integrated into the frame which allows the machine to automatically start, count pieces of fruit, and prevent jamming;
   a peel collector;
   an anti-drip device; and
   a customized juice container that is integrated into the housing base of the machine, that together with the guiding wing of the cover isolate the juice from becoming contaminated with particles and extraneous elements.

2. The reduced size fruit juicing machine of claim 1, further comprising:
   a set of gears driven by the motor and designed to actuate the one sole female drum, the one sole male drum, and a perimeter cam, the perimeter cam operative to cause both a rocker arm and a counterweight to operate and stop operating to drive the turning device such that the turning device rotates the second half of the fruit into a second cavity of the female drum, and the set of gears further causing the retaining pendulum to actuate the dispenser of the feeder, thereby allowing a new fruit to fall into the one sole female drum in order to continue the juicing sequence.

3. The reduced size fruit juicing machine of claim 1:
   wherein the cutting blade is automatically positioned so that the first half and second half of the piece of fruit will be of a substantially same size; and
   wherein the cutting blade, together with the triangular cutting piece, is operative to guide the first or second half of the fruit to the one sole male drum, thereby preventing the fruit from falling.

4. The reduced size fruit juicing machine of claim 1, further comprising:
   a plurality of recesses in the one sole female drum; and
   wherein each cavity of the one sole female drum is deep enough to allow the fruit to be seated therein.

5. The reduced size fruit juicing machine of claim 1, further comprising:
   a single piece housing encompassing the frame and the fruit detection system; and
   wherein the fruit detection system includes:
     two guide rails; and
     a cylindrical dispenser including a slightly eccentric shaft, a magnetic clutch, a flexible transmission operatively connected to the rocker arm, and a ribbed opening that allows the fruit to pass towards the one sole female drum.

6. The reduced size fruit juicing machine of claim 1, wherein the housing base further includes:
   a U-shaped support part having an inclined upper surface that allows lost liquid to flow into the juice collecting container;
   a perimeter edge on a lower side which is configured with a sealing strip on a supporting surface;
   coupling cavities for installing legs; and
   a securing closing plate that serves as a posterior part of the base in the U-shaped support part for adding handles.

7. The reduced size fruit juicing machine of claim 1, wherein the peel collector includes a premarked rupture area in a lower part thereof and a ramp that deflects peels towards an exit aperture in the event of perforation.

8. The reduced size fruit juicing machine of claim 1, wherein the juice collecting container further includes an anti-drip device, having a lower part, that may be actuated either automatically by placing the juice collecting container in the lower part or manually by pushing a control button that causes a piston to move downward, thereby allowing the juice to flow freely.

9. The reduced size fruit juicing machine of claim 1, wherein the front cover, having an interior and a base, includes:

one or more hinges; and a juice routing wing on the interior with an extension in an area near the hinges such that when the front cover is in an open position, the juice will continue to be poured into the juice collecting container.

10. The reduced size fruit juicing machine as per claim 1 further comprising a lemniscate part, made of resistant material, configured to house shaft bearings and to absorb forces exerted upon the shaft bearings during juicing.

11. The reduced size fruit juicing machine as per claim 1, further comprising:

a drum shaft corresponding to the one sole female drum and a drum shaft corresponding to the one sole male drum, each shaft having grooves on at least one end that are complimentarily shaped to connect with protuberances located on the corresponding drum.

* * * * *